Dec. 5, 1967   W. J. BIRD   3,356,317
AEROPLANES HAVING WINGS PIVOTABLE IN SWEEP
Filed Jan. 17, 1966   6 Sheets-Sheet 1

Inventor
Walter John Bird
By Wolte & Wolte
Attorneys

Dec. 5, 1967    W. J. BIRD    3,356,317
AEROPLANES HAVING WINGS PIVOTABLE IN SWEEP
Filed Jan. 17, 1966    6 Sheets-Sheet 2

Inventor
Walter John Bird
By Nolte + Nolte
Attorney

Dec. 5, 1967 W. J. BIRD 3,356,317
AEROPLANES HAVING WINGS PIVOTABLE IN SWEEP
Filed Jan. 17, 1966 6 Sheets-Sheet 3
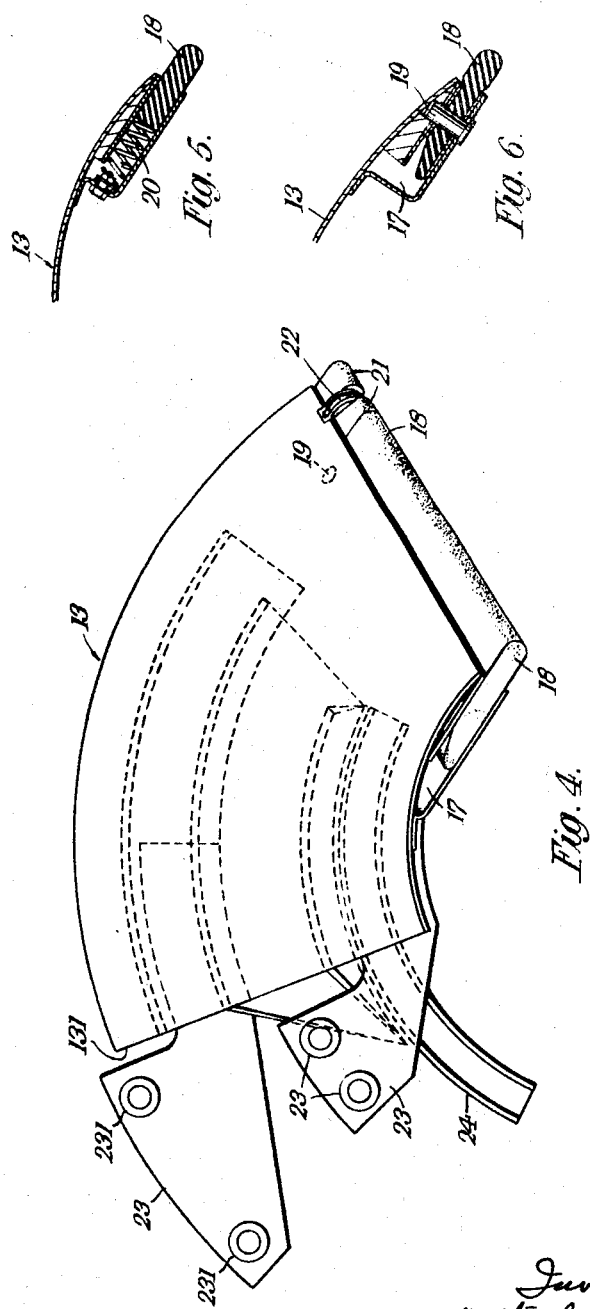

Dec. 5, 1967　　　　　　　W. J. BIRD　　　　　　　3,356,317
AEROPLANES HAVING WINGS PIVOTABLE IN SWEEP
Filed Jan. 17, 1966　　　　　　　　　　　　　　6 Sheets-Sheet 4

Inventor
Walter John Bird
By Holte + Holte
Attorneys

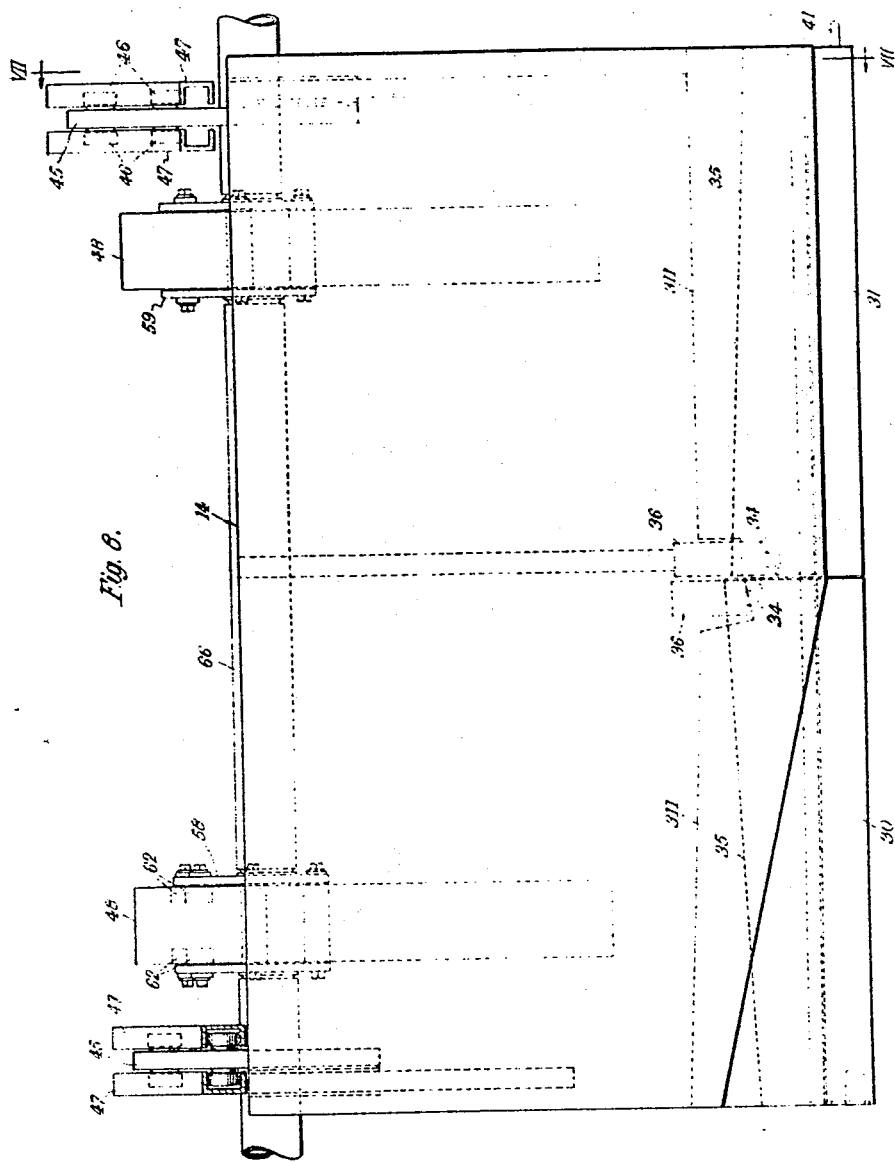

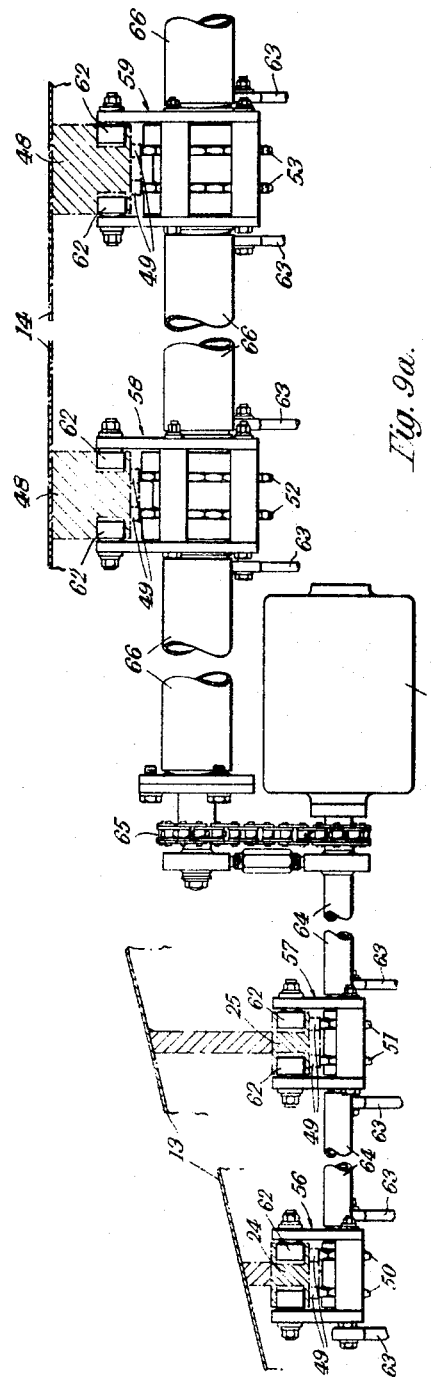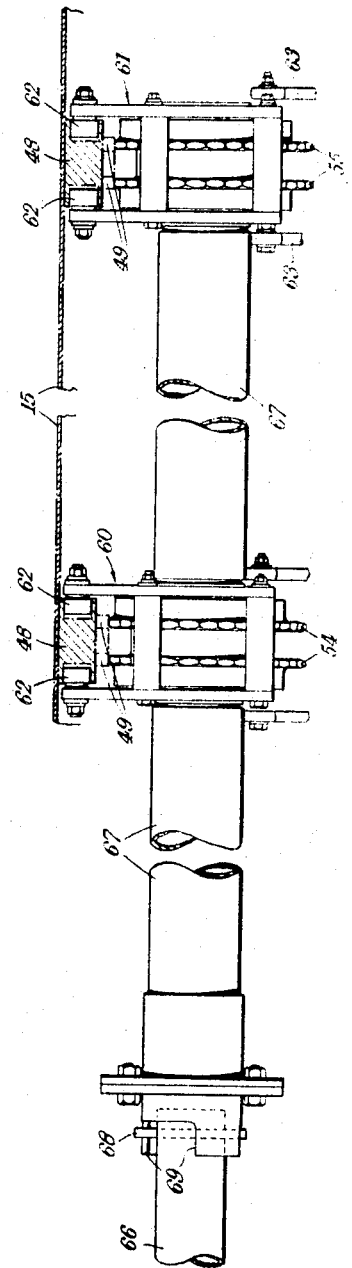

United States Patent Office 3,356,317
Patented Dec. 5, 1967

3,356,317
AEROPLANES HAVING WINGS PIVOTABLE IN SWEEP
Walter John Bird, Feltham, England, assignor to British Aircraft Corporation (Operating) Limited, London, England, a British company
Filed Jan. 17, 1966, Ser. No. 521,030
Claims priority, application Great Britain, Jan. 19, 1965, 2,397/65
9 Claims. (Cl. 244—46)

ABSTRACT OF THE DISCLOSURE

An aeroplane which has wings pivotable in sweep. The aeroplane has a fuselage provided at each side with a longitudinal slot of a size which can accommodate the full cross-section of the respective wing along its line of intersection with the fuselage in the swept-aft position. A plurality of retractile gap-closing doors are mounted on the fuselage in series along the length of each slot, and each door extends between the upper edge of the slot and the subjacent upper surface of the wing or lower edge of the slot. Seal members are mounted on the lower edges of the doors, and powered means are provided for extending and retracting at least some of the doors. A control device is arranged to actuate the powered means so as to move the doors in the appropriate sense for maintaining the slots substantially closed in all positions of the wings in sweep.

---

The invention has reference to aeroplanes having wings pivotable in sweep, the wings being mounted upon pivots situated within the fuselage or body in such manner as to be capable of movement between an outspread position appropriate for take-off and landing and comparatively low-speed flight, and a swept-aft position suitable for comparatively high-speed flight. As the wings are pivoted from the outspread to the swept-aft position, the line of intersection between each wing and the fuselage (as seen in plan) necessarily lengthens, and in particular the point of intersection of the trailing edge of the wing with the side of the fuselage moves aft. In order to accommodate the movement of the wings it is therefore necessary to provide in the wall of the fuselage, on each side, a longitudinal slot of sufficient size to admit the full cross-section of the wing along this line of intersection in the swept-aft position, although in other positions of the wings gaps will then exist in the sides of the fuselage. It is an object of the present invention to provide improved means for closing and fairing these gaps.

According to the invention, an aeroplane comprises wings pivotable in sweep, a fuselage having in each side a longitudinal slot of a size to accommodate the full cross-section of the respective wing along its line of intersection with the fuselage in the swept-aft position, a plurality of retractile gap-closing doors mounted on the fuselage in series along the length of the slot and each extending between the upper edge of the slot and the subjacent upper surface of the wing or lower edge of the slot, seal members mounted on the lower edges of the doors, powered means for extending and retracting at least some of the doors, and a control device arranged to actuate the powered means to move the doors in the appropriate sense on movement of the wing in sweep.

Figure 1:
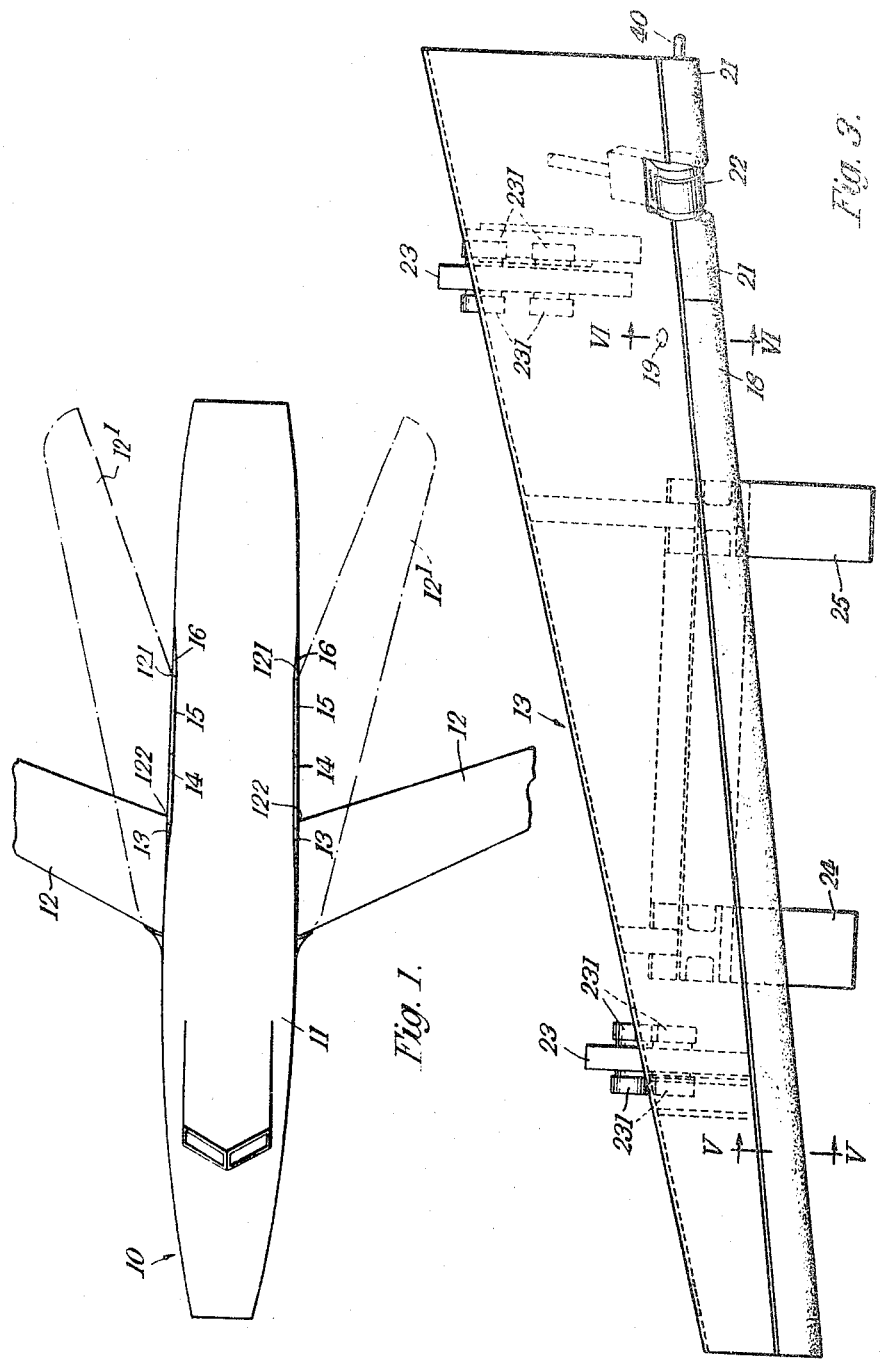
Figure 2:
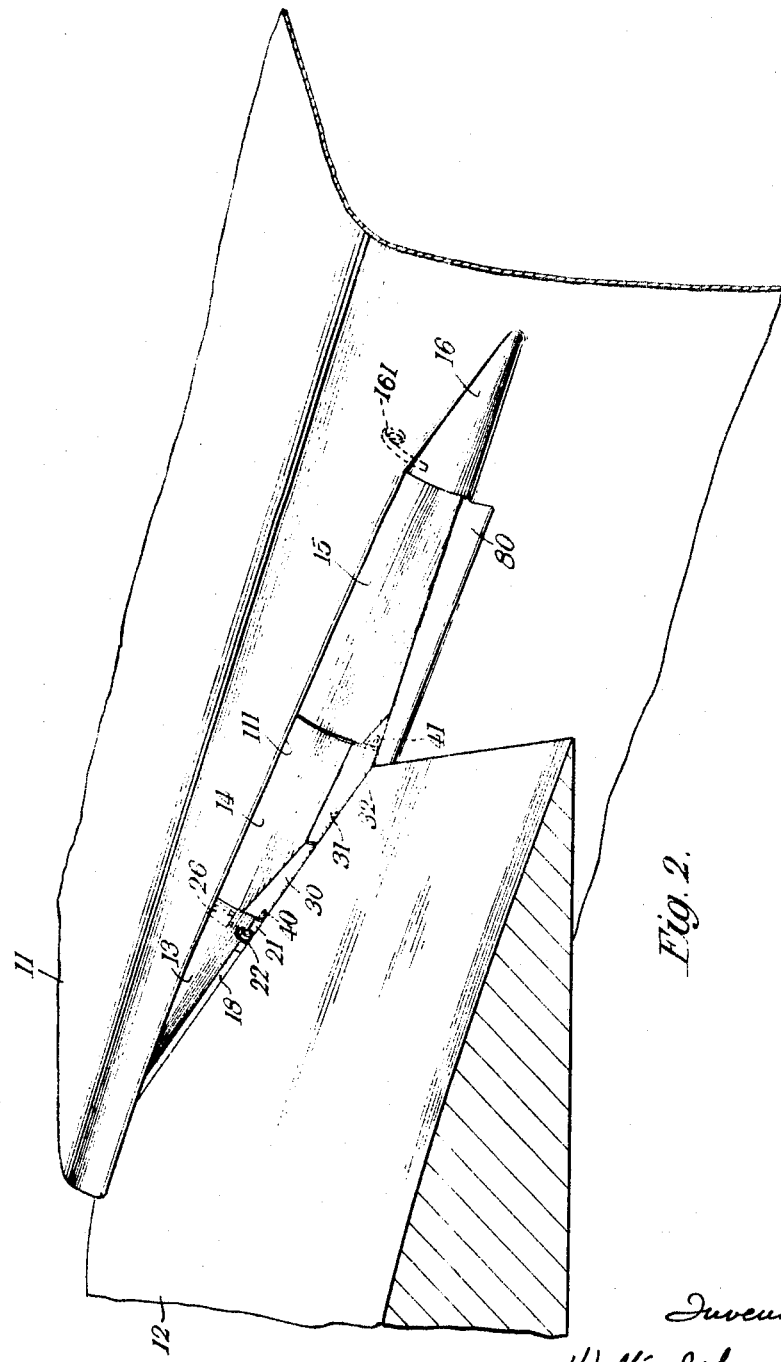
Figure 7:
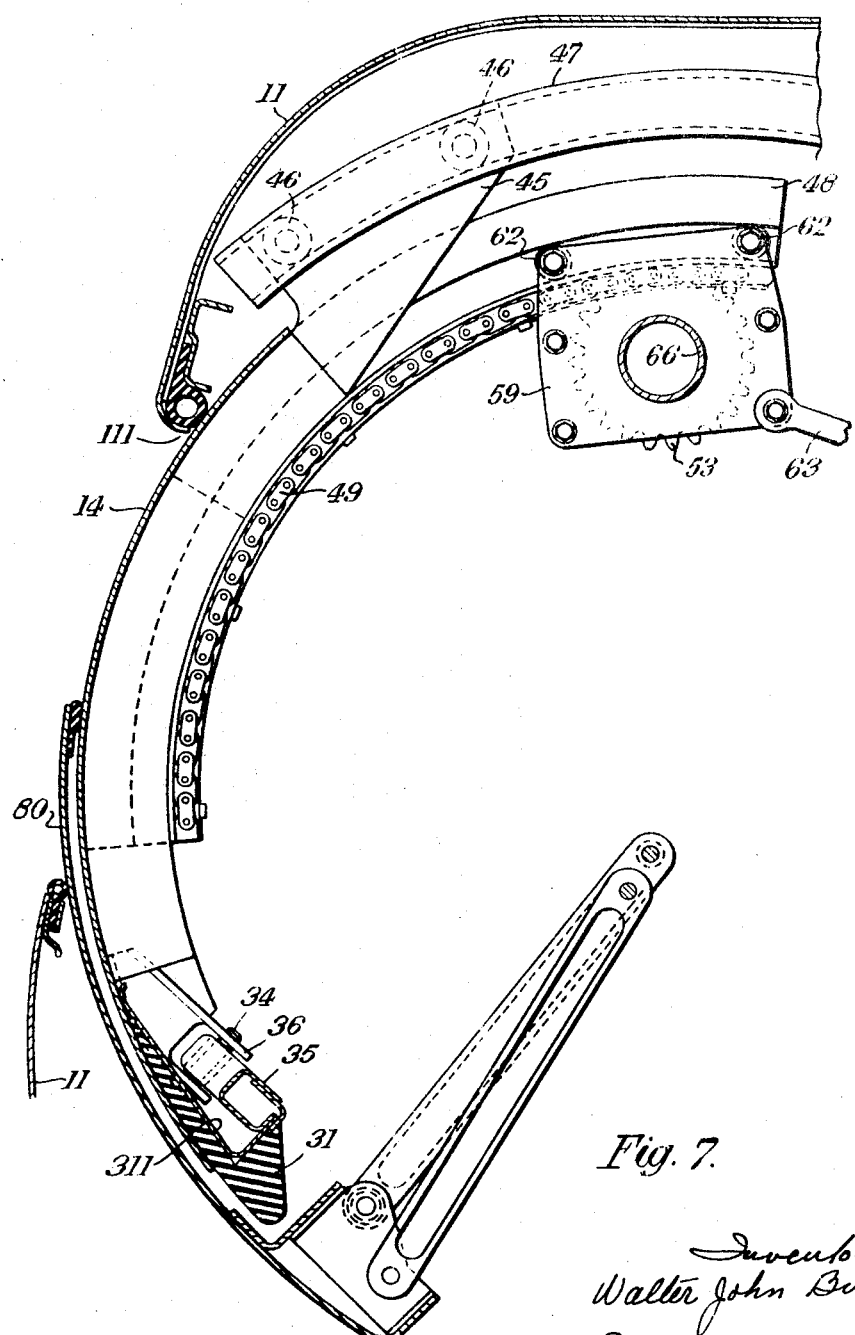

A particular embodiment of the invention will now be described in more detail by way of example and with reference to the accompanying drawings, in which:

FIG. 1 is a diagrammatic plan view of an aircraft,

FIG. 2 is a detail perspective view to a larger scale, showing the gap-closing doors, with the wing in a partly-swept position, FIG. 3 is a side elevation of the forward door, FIG. 4 is an end elevation of the forward door, seen from the front, FIG. 5 is a section on the line V—V of FIG. 3, FIG. 6 is a section on the line VI—VI of FIG. 3, FIG. 7 is a cross-section through part of the fuselage and the second door, on the line VII—VII of FIG. 8, FIG. 8 is an elevation of the second door, FIGS. 9a and 9b show in elevation a driving shaft for moving the doors, FIG. 9b being a continuation of the structure of FIG. 9a.

In the embodiment illustrated, an aircraft 10 has a fuselage 11 and wings 12 mounted in the fuselage for adjustment in sweep, between the positions shown in continuous lines and those shown in chain lines at 12'. In the latter, swept-back position, the trailing edge of each wing 12 enters the side of the fuselage 11 at a point 121 considerably further aft than the point 122 at which it enters in the forward position of the wing. A pair of longitudinal slots must therefore be provided, one in each side of the fuselage 11, as shown at 111 in FIG. 2. Doors 13, 14, 15 and 16 are provided to close the gap which exists, in the forward position of the wing 12, between the upper edge of the slot 111 and the subjacent upper surface of the wing 12 or lower edge of the slot 111. The first three doors 13, 14 and 15 are capable of upward sliding retractile movement, while the rear door 16 is pivotably retractile about its upper edge into the fuselage 11.

FIGS. 3 to 9b illustrate a particular construction of the doors and retracting mechanism, constructed for "mock-up" purposes. The forward door 13 is conical in form as can best be seen from FIGS. 3 and 4. Its lower edge is formed with a channel 17 accommodating a sealing strip 18 of medium hard rubber. As shown in FIGS. 3 and 6, the sealing strip 18 is pivoted near its rear end on a pin 19. It is biassed downwards into the position shown by a light coil spring 20 (FIG. 5). To the rear of the pivoted sealing strip 18 is a short fixed sealing strip 21 of similar material and section, and recessed into this fixed strip 21 is a sensing element 22, which is connected to the stylus of a control valve 26 represented diagrammatically in FIG. 2. The upper, inboard edge 131 (FIGS. 3 and 4) of the conical door 13 carries a pair of brackets 23 which are provided with rollers 231 running in tracks (not shown) in the interior of the fuselage 11, as described below in connection with FIGS. 7 and 8. The door 13 also has a pair of part-circular rails 24, 25 extending inboard and arranged as described below in connection with FIGS. 7 and 8 to be used for effecting movement of the door 13.

The two main doors 14 and 15 are cylindrical in shape and similar to one another. As seen in FIGS. 2, 7 and 8, the door 14 is provided along its lower edge with a pair of hook-section rubber sealing strips 30, 31, having internal angle-section retaining plates 311 (FIG. 7). A similar pair of sealing strips is provided on the lower edge of the door 15, and one of these strips 32 is visible in FIG. 2. Each sealing strip has one of its ends pivoted to its respective door 14, 15 near the mid-length of the door, while the other end of the strip is free to move up and down relative to the door to a limited extent. FIG. 7 shows how the end of the strip 31 adjacent the mid-length of the door 14 carries a bracket 35 which is secured to its retaining plate 311 and pivots on a pin 34 held in a bracket 36 secured to the door 14. The outer ends of the strips have pin-and-slot connections as shown diagrammatically in FIG. 2, to limit their up and down movement. Thus the sealing strip 21 on the conical door 13 carries a pin 40 engaging in a slot in the strip 30 on door 14, while strip 31 on door 14 carries a pin 41 engaging in a slot in strip 32 on door 15. The other strip of door 15 is prevented from moving downward too far because its inner end would abut against the adjacent end of strip 32.

As shown in FIGS. 2 and 7, a further cylindrical door 80 may be disposed substantially co-axially with the doors 14, 15 and lightly urged upwardly by a spring (not shown). In the swept-aft position of the wing 12, the upper edge of the door 80 contacts the under surface of the wing, while in the forward position of the wing the door 80 partly overlaps the doors 14, 15 as shown in FIG. 7.

Each of the doors 14 and 15 carries at its upper edge a pair of upwardly projecting brackets 45 similar to the brackets 23 on the door 13 and carrying rollers 46 like the rollers 231 which run in arcuate tracks 47 mounted in the fuselage 11, so as to guide the door in its movement between the extended position shown and the retracted position in which it is housed in the fuselage.

Each door 14 and 15 also has a pair of part-circular rails 48 of horizontal H-section, similar to the rails 24, 25 of the door 13, secured to its inner surface and continuing above the top edge of the door, parallel with the tracks 47. Each of the rails 24, 25, 48 has a pair of chains 49 secured to its inner surface. These chains mesh with respective pairs of chain sprockets 50, 51, 52, 53, 54, 55 (FIGS. 9a and 9b), each pair of chain sprockets being mounted in a respective housing 56, 57, 58, 59, 60, 61 which is provided with rollers 62 engaging in the recesses between the side flanges of the rails 24, 25, 48, and which is located in relation to the fuselage 11 by stays 63. The chains and sprockets form substitution gears for mock-up purposes. In practice, toothed racks and gears would be used.

The pairs of chain sprockets 50, 51 which mesh with the chains 49 attached to the rails 24, 25 on the door 13 are mounted on a shaft 64, which is connected by chain gearing 65 to a second shaft 66 on which are mounted the pairs of sprockets 52, 53 which mesh with the chains 49 attached to the rails 48 on the door 14. The shaft 66 is connected to a third, co-axial shaft 67 through a lost-motion device comprising a transverse driving pin 68, passing through the end of the shaft 66 and engaging in an enlarged slot 69 in the end of shaft 67. Shaft 67 carries the pairs of sprockets 54, 55 which mesh with the chains 49 attached to the rails 48 on the third door 15. A hydraulic motor 70 is connected to drive the shaft 64 and is arranged to be actuated by control valve 26 as soon as the sensing element 22 senses movement of the wing 12 in sweep.

The small triangular rear door 16 is pivoted at its upper edge and urged towards the extended or closed position shown in FIG. 2 by a spring 161.

In operation, when the wing 12 commences to move from the position shown in full lines in FIG. 1 towards the position shown at 12', the first effect is to compress the sealing strips 18, 21 on the door 13 which are in contact with the wing, until the wing surface contacts the sensing element 22, thereby actuating the control valve 26 and hence the motor 70. The motor 70 rotates the shaft 64 and, through the chain gearing 65, the shaft 66. As the sprocket pairs 50, 51, 52, 53 rotate in their housings, they drive the chains 49 and the associated rails 24, 25, 48 so as to lift the doors 13, 14 to open a gap into which the trailing edge of the wing 12 can enter. The sealing strips 18, 21, 30, 31 on the doors 13, 14 engage the wing surface. When the lost-motion of the pin 68 in the slot 69 has been taken up, the shaft 67 is also rotated to open the door 15. Finally the rear door 16 is opened by contact with the trailing edge of the wing 12. The diameters of the sprockets are chosen so as to obtain the desired ratio of opening movements of the doors 13, 14, 15.

On movement of the wing 12 forward from the position 12', the rear door 16 is closed by its spring and the sensing element 22 senses the withdrawal of the wing and actuates the control valve 26 to rotate the motor 70 to close the doors 15, 14 and 13 in the reverse manner to that described above.

What I claim as my invention and desire to secure by Letters Patent is:

1. An aeroplane comprising wings pivotable in sweep, a fuselage having in each side a longitudinal slot of a size to accommodate the full cross-section of the respective wing along its line of intersection with the fuselage in the swept-aft position, a plurality of retractile gap-closing doors mounted on the fuselage in series along the length of each slot and each door extending between the upper edge of the slot and the subjacent upper surface of the wing or lower edge of the slot, seal members mounted on the lower edges of the doors, powered means for extending and retracting at least some of the doors, and a control device arranged to actuate the powered means to move the doors in the appropriate sense for maintaining the slots substantially closed in all positions of the wings in sweep.

2. An aeroplane comprising wings pivotable in sweep, a fuselage having in each side a longitudinal slot of a size to accommodate the full cross-section of the respective wing along its line of intersection with the fuselage in the swept-aft position, a plurality of retractile gap-closing doors mounted on the fuselage in series along the length of each slot and each door extending between the upper edge of the slot and the subjacent upper surface of the wing or lower edge of the slot, seal members mounted on the lower edges of the doors, powered means for extending and retracting at least some of the doors, and a control device arranged to actuate the powered means to move the doors in the appropriate sense on movement of the wings in sweep, said control device being connected to a sensing element in one of the seal members.

3. An aeroplane according to claim 2, wherein the sensing element is recessed into a sealing strip fixed to the forward door.

4. An aeroplane comprising wings pivotable in sweep, a fuselage having in each side a longitudinal slot of a size to accommodate the full cross-section of the respective wing along its line of intersection with the fuselage in the swept-aft position, a plurality of slidably retractile gap-closing doors mounted on the fuselage in series along the length of each slot, seal members extending along the lower edges of said doors the forward door on each side of the fuselage being conical in shape and its seal member contacting the upper surface of the respective wing in all positions of the latter, the following doors being cylindrical in shape and their seal members contacting the upper surfaces of the wings in the swept-aft position of the latter, powered means for retracting said doors, and a control device arranged to actuate said powered means to move the doors in the appropriate sense for maintaining the slots substantially closed in all positions of the wings in sweep.

5. An aeroplane comprising wings pivotable in sweep, a fuselage having in each side a longitudinal slot of a size to accommodate the full cross-section of the respective wing along its line of intersection with the fuselage in the swept-aft position, a plurality of slidably retractile gap-closing doors mounted on the fuselage in series along the length of each slot, seal members extending along the lower edges of said doors, the forward door on each side of the fuselage being conical in shape and its seal member contacting the upper surface of the respective wing in all positions of the latter, the following doors being cylindrical in shape and their seal members contacting the upper surfaces of the wings in the swept-aft position of the latter, powered means for retracting said doors, and a control device arranged to actuate said powered means to move the doors in the appropriate sense on movement of the wings in sweep, said seal member of each of the slidably retractile doors being in the form of a pair of flexible sealing strips, the two strips being pivoted to the door near its mid-length and extending to opposite ends of the door.

6. An aeroplane according to claim 4, wherein each of the slidably retractile doors carried brackets provided with rollers running in arcuate tracks in the interior of the fuselage.

7. An aeroplane according to claim 4, wherein each of the slidably retractile doors carries at least one arcuate rail secured to its inner surface and carrying a toothed member meshing with a toothed wheel mounted on a driving shaft forming part of the powered means.

8. An aeroplane comprising wings pivotable in sweep, a fuselage having in each side a longitudinal slot of a size to accommodate in full cross-section of the respective wing along its line of intersection with the fuselage in the swept-aft position, a plurality of slidably retractile gap-closing doors mounted on the fuselage in series along the length of each slot, seal members extending along the lower edges of said doors, the forward door on each side of the fuselage being conical in shape and its seal member contacting the upper surface of the respective wing in all positions of the latter, the following doors being cylindrical in shape and their seal members contacting the upper surfaces of the wings in the swept-aft position of the latter, powered means for retracting said doors, and a control device arranged to actuate said powered means to move the doors in the appropriate sense on movement of the wings in sweep, each of the slidably retractile doors carrying at least one arcuate rail secured to its inner surface and carrying a toothed member meshing with a toothed wheel mounted on a driving shaft forming part of the powered means, said driving shaft being in at least two parts, with a lost-motion device therebetween, arranged so that the rearmost slidably retractile door is retracted after the forward doors.

9. An aeroplane comprising wings pivotable in sweep, a fuselage having in each side a longitudinal slot of a size to accommodate in full cross-section of the respective wing along its line of intersection with the fuselage in the swept-aft position, a plurality of slidably retracted gap-closing doors mounted on the fuselage in series along the length of each slot, seal members extending along the lower edges of said doors, the forward door on each side of the fuselage being conical in shape and its seal member contacting the upper surface of the respective wing in all positions of the latter, the following doors being cylindrical in shape and their seal members contacting the upper surface of the wings in the swept-aft position of the latter, powered means for retracting said doors, and a control device arranged to actuate said powered means to move the doors in the appropriate sense on movement of the wings in sweep, and a further gap-closing door being pivoted to the upper edge of the slot aft of the rearmost slidably retractile door and being retracted by the trailing edge of the wing against a spring as the wing reaches its fully swept-aft position.

References Cited
UNITED STATES PATENTS

| | | | |
|---|---|---|---|
| 2,577,697 | 12/1951 | Castle | 244—129 |
| 2,822,995 | 2/1958 | Bowen | 244—46 |

FERGUS S. MIDDLETON, *Primary Examiner.*

B. BELKIN, *Assistant Examiner.*